United States Patent [19]

Kojima et al.

[11] Patent Number: 5,662,198
[45] Date of Patent: Sep. 2, 1997

[54] TANDEM TYPE HYDRAULIC CLUTCH SYSTEM

[75] Inventors: Yoichi Kojima; Yoshihiro Kodama, both of Saitama, Japan

[73] Assignee: Honda Giken Kogyo Kabushiki Kaisha, Tokyo, Japan

[21] Appl. No.: 516,543

[22] Filed: Aug. 18, 1995

[30] Foreign Application Priority Data

Aug. 19, 1994 [JP] Japan .................................. 6-195186

[51] Int. Cl.$^6$ .......................... F16D 25/10; F16D 25/0638
[52] U.S. Cl. ................................. 192/87.11; 192/106 F
[58] Field of Search ........................... 192/87.11, 106 F, 192/87.1, 48.8; 475/146

[56] References Cited

U.S. PATENT DOCUMENTS

| | | | |
|---|---|---|---|
| 3,581,858 | 6/1971 | Haley | 192/106 F |
| 4,237,749 | 12/1980 | Koivunen | 192/87.11 X |
| 4,964,504 | 10/1990 | Friedmann | 192/87.11 X |
| 4,982,826 | 1/1991 | Holbrook | 192/106 F |

FOREIGN PATENT DOCUMENTS

| | | |
|---|---|---|
| 1160308 | 7/1964 | Germany. |
| 6910124 | 3/1969 | Germany. |
| 1550778 | 7/1969 | Germany. |
| 2215165 | 1/1973 | Germany. |
| 3838865 | 6/1989 | Germany. |
| 2-125164 | 5/1990 | Japan. |
| 9503497 | 2/1995 | WIPO. |

*Primary Examiner*—Rodney H. Bonck
*Attorney, Agent, or Firm*—Lyon & Lyon LLP

[57] ABSTRACT

Frictional engagement elements of a first hydraulic clutch and frictional engagement elements of a second hydraulic clutch are supported on a common clutch drum on opposite sides of a snap ring. Openings are defined respectively in the clutch drum and an urging member which is formed integrally with a clutch piston of the second hydraulic clutch for urging the frictional engagement elements toward the snap ring. An urging member for urging the frictional engage elements toward the snap ring is connected to a clutch piston of the first hydraulic clutch and extends through the openings to the outside of the clutch drum. Thus, the pair of hydraulic clutches disposed in a tandem fashion can be operated stably without interference from each other.

15 Claims, 14 Drawing Sheets

TANDEM TYPE HYDRAULIC CLUTCH SYSTEM

BACKGROUND OF THE INVENTION

1. Field of the Invention

The present invention relates to a tandem type hydraulic clutch system including: a first hydraulic clutch for urging a first frictional engagement element by a first urging member connected to a first clutch piston which is driven by a hydraulic pressure applied to a first clutch oil chamber; and a second hydraulic clutch for urging a second frictional engagement element by a second urging member connected to a second clutch piston which is driven by a hydraulic pressure applied to a second clutch oil chamber, the first and second hydraulic clutches being axially juxtaposed.

2. Description of the Prior Art

Such a tandem type hydraulic clutch system is conventionally known from Japanese Patent Application Laid-open No.125164/90.

As shown in FIG. 16, the known tandem type hydraulic clutch system includes a first hydraulic clutch $C_1$ which has a first clutch piston $02_1$ axially slidably fitted to an inner periphery of a clutch drum $01$, a first urging member $03_1$ axially extending from an outer periphery of the first clutch piston $02_1$, and first frictional engagement elements $05_1$ which are disposed between the clutch drum $01$ and a first rotary member $04_1$ and brought into pressure contact with one another by the first urging member $03_1$; and a second hydraulic clutch $C_2$ which has a second clutch piston $02_2$ axially slidably fitted to an inner periphery of the first urging member $03_1$, a second urging member $03_2$ axially extending from an outer periphery of the second clutch piston $02_2$, and second frictional engagement elements $05_2$ which are disposed between the first urging member $03_1$ and a second rotary member $04_2$ and brought into pressure contact with one another by the second Urging member $03_2$.

The known tandem type hydraulic clutch system suffers from the following problem. When the first clutch piston $02_1$ and the first urging member $03_1$ of the outer first hydraulic clutch $C_1$ are axially slid, the second clutch piston $02_2$, the second urging member $03_2$ and the second frictional engagement elements $05_2$ are also axially slid in a dragged manner and for this reason an unnecessary friction is generated, resulting in an unstable operation.

SUMMARY OF THE INVENTION

Accordingly, it is an object of the present invention to prevent the first and second hydraulic clutches of the tandem type hydraulic pressure clutch system from interfering with each other to perform a stable operation.

To achieve the above object, according to the present invention, there is provided a tandem type hydraulic clutch system, comprising: a first hydraulic clutch for urging a first frictional engagement element by a first urging member connected to a first clutch piston which is driven by a hydraulic pressure applied to a first clutch oil chamber; and a second hydraulic clutch for urging a second frictional engagement element by a second urging member connected to a second clutch piston which is driven by a hydraulic pressure applied to a second clutch oil chamber, the first and second hydraulic clutches being axially juxtaposed, wherein the first and second frictional engagement elements are supported on axially opposite sides of a stopper fixedly mounted on a clutch drum, with the first frictional engagement element being urged toward the stopper by the first urging member and the second frictional engagement element being urged toward the stopper by the second urging member.

With the above construction, the operations of the first and second hydraulic clutches can independently be conducted without exertion of an influence on each other and thus are stabilized.

The second clutch piston and the second urging member may be disposed within the clutch drum, and the first clutch piston disposed within the clutch drum and the first urging member disposed outside the clutch drum may be connected to each other through openings defined in the clutch drum and the second urging member. With this arrangement, even if both the clutch pistons are disposed adjacent each other, the urging members cannot interfere with each other, and the entire system can be made compact.

If a second clutch oil chamber is defined between the clutch drum and the second clutch piston, and the openings are located radially outside the second clutch oil chamber, it is possible to maintain the function of a first clutch oil chamber without use of a special sealing member.

If a canceler oil chamber is defined between the first and second clutch pistons, a special member for defining the canceler oil chamber is not required, leading to a decreased number of parts or components.

The above and other objects, features and advantages of the invention will become apparent from the following description of preferred embodiments taken in conjunction with the accompanying drawings.

DESCRIPTION OF THE PREFERRED EMBODIMENTS

Figure 1:
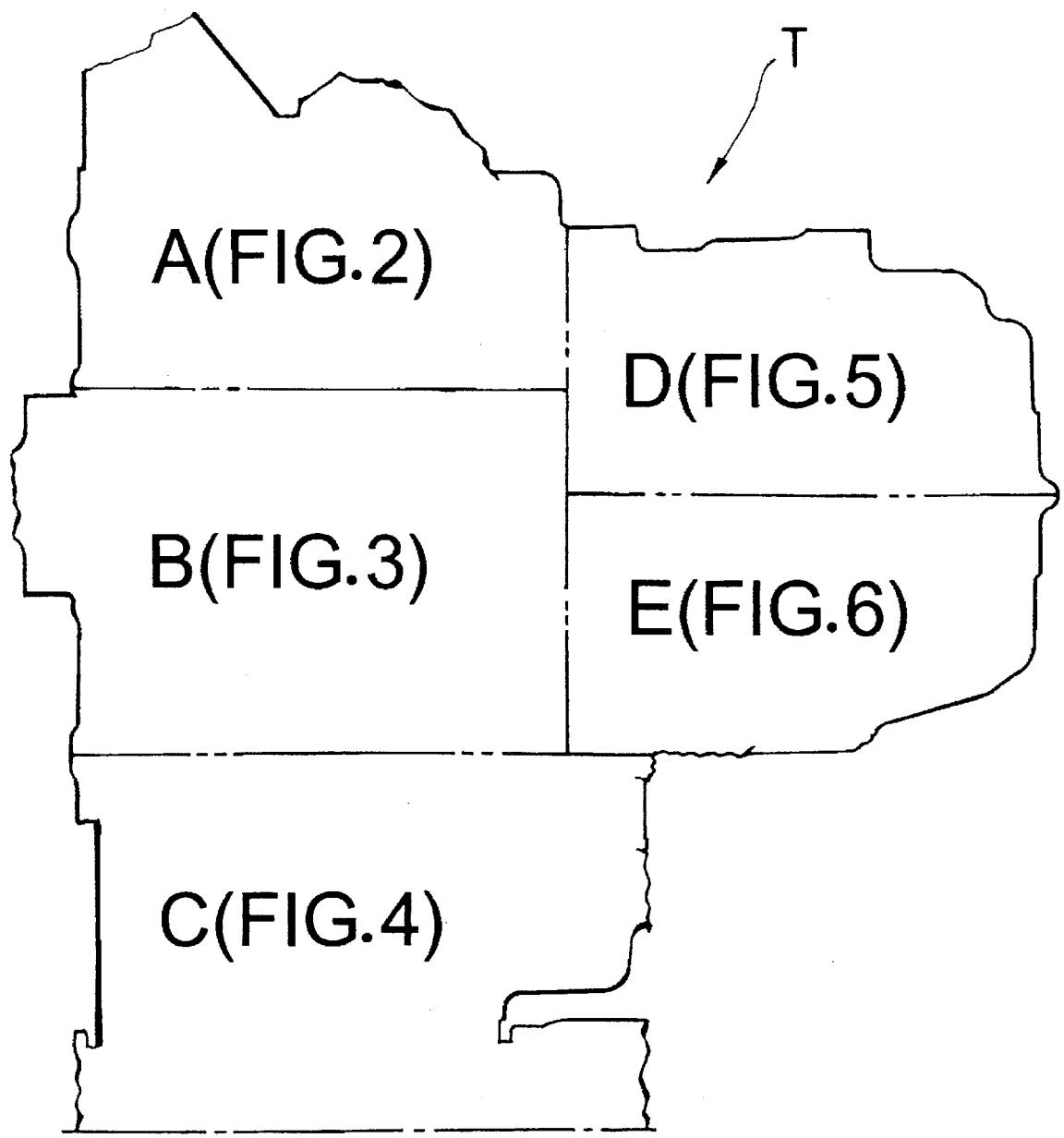
FIG. 1 is a schematic diagram of the sections of a transmission to which an embodiment of the present invention is applied.
Figure 2:
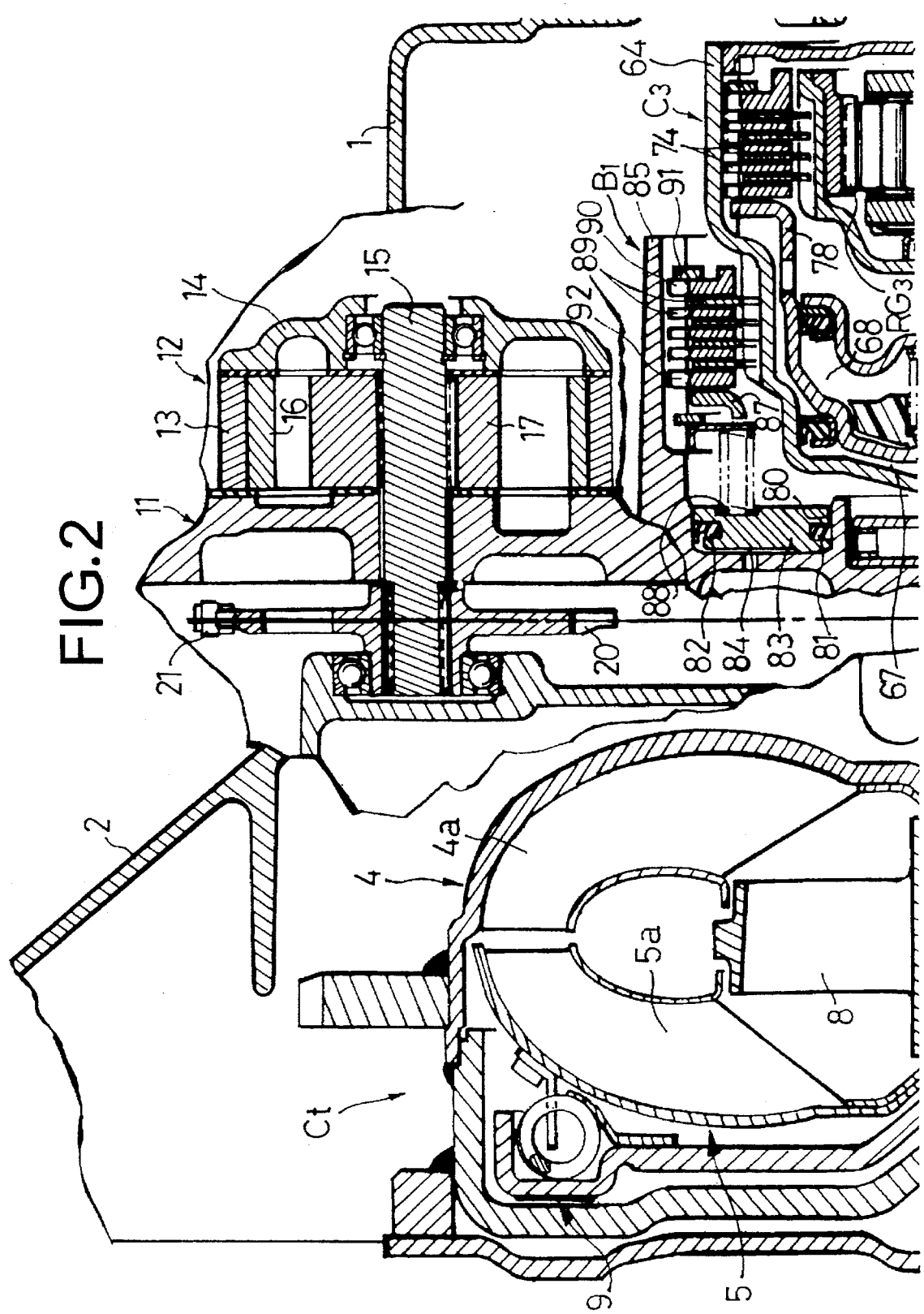
FIG. 2 is an enlarged view of a section A shown in FIG. 1.
Figure 3:
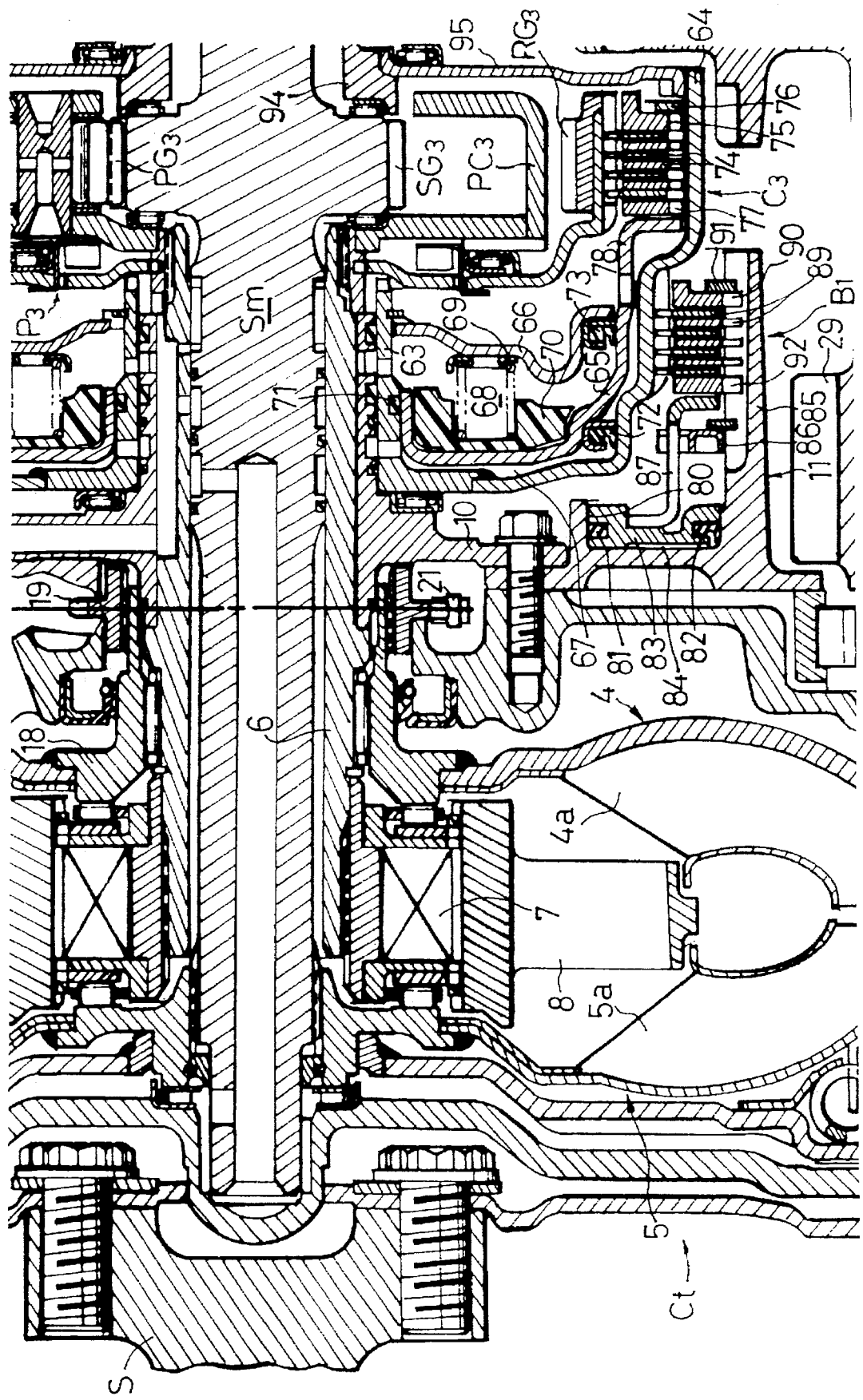
FIG. 3 is an enlarged view of a section B shown in FIG. 1.
Figure 4:
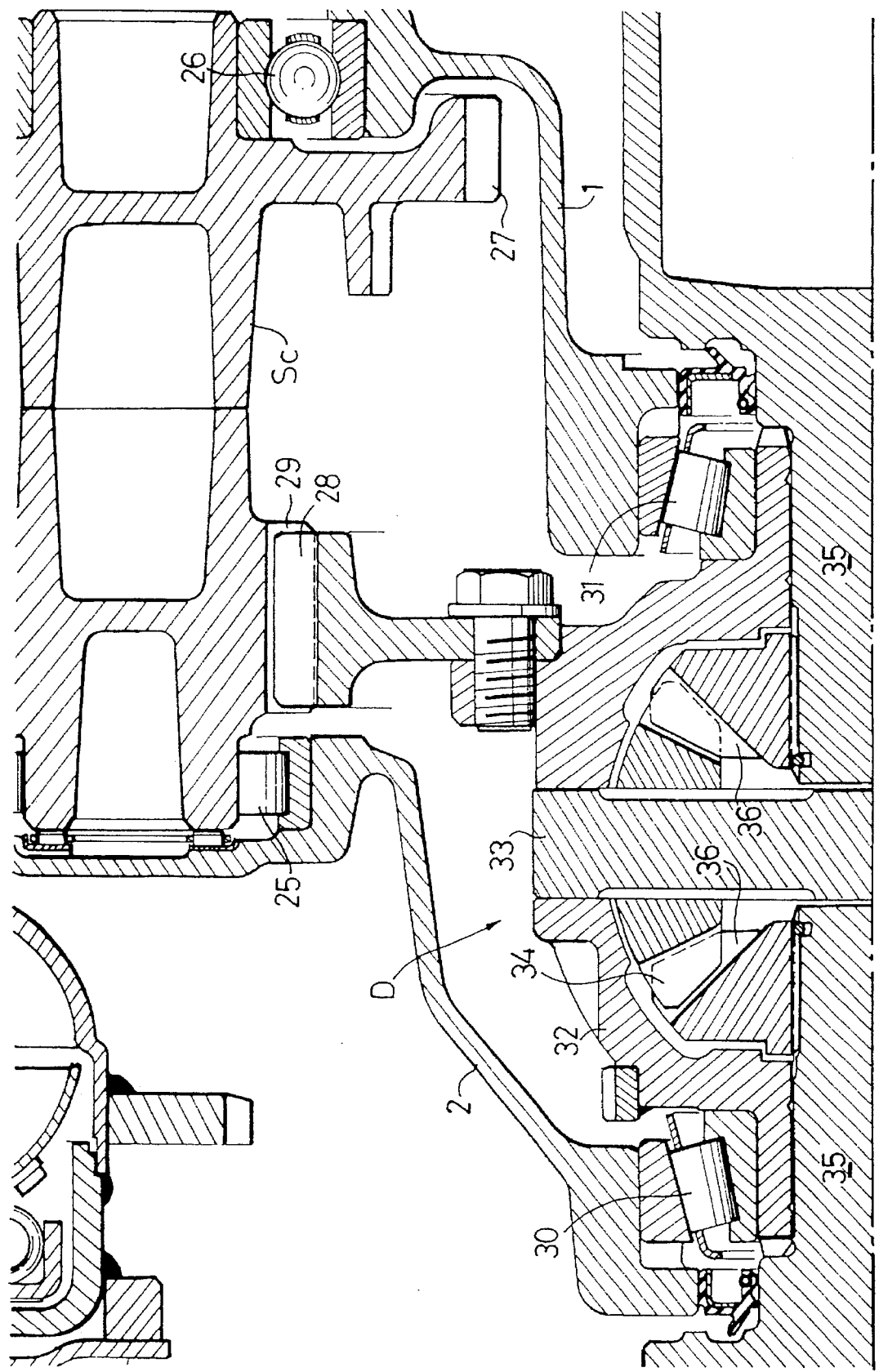
FIG. 4 is an enlarged view of a section C Shown in FIG. 1.
Figure 7:
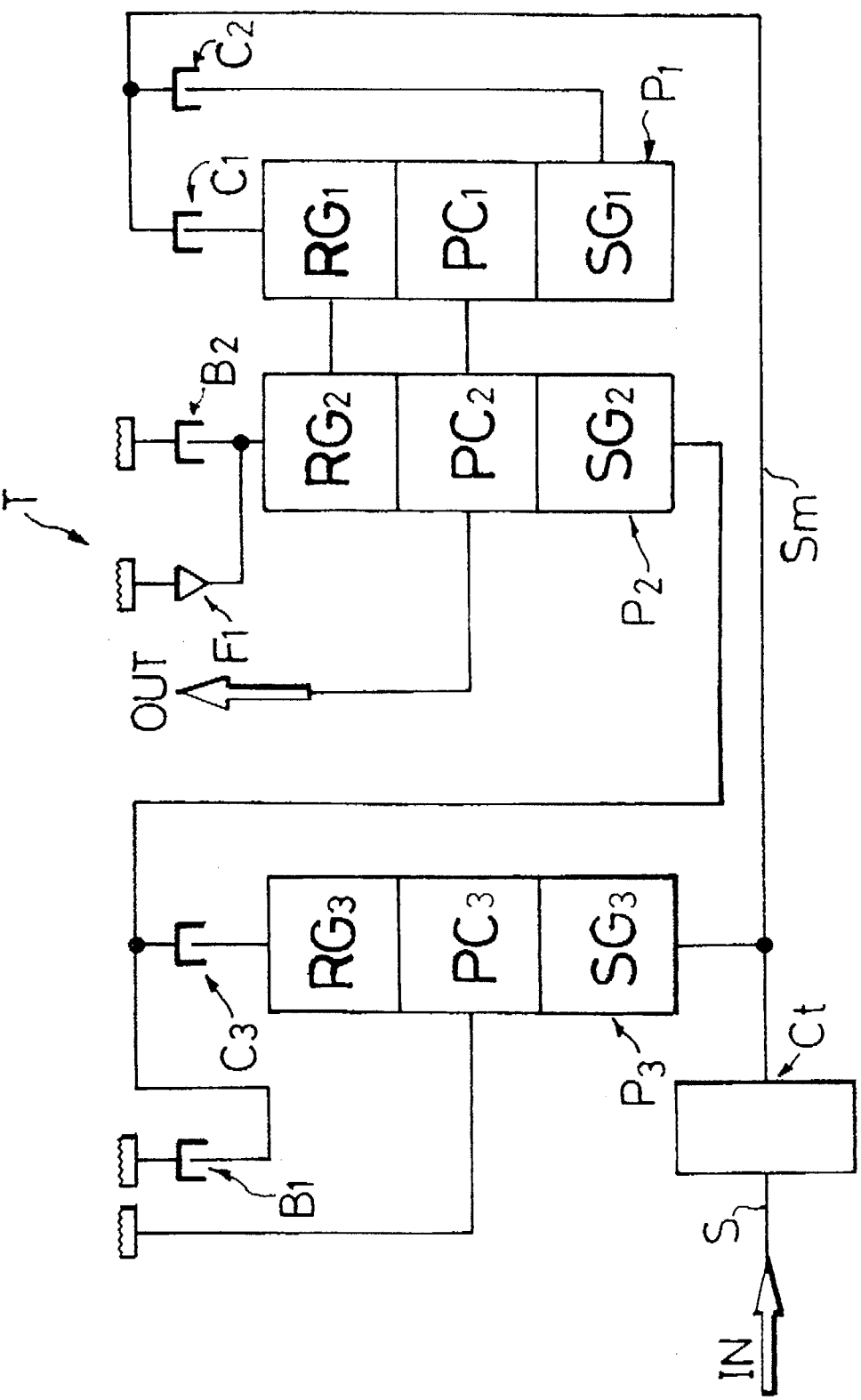
FIG. 7 is a schematic diagram of the transmission.

A transmission T shown in FIG. 7 is an automatic transmission having five forward stages and one reverse stage, and is provided, on a main shaft Sm, with three planetary gear mechanisms $P_1$, $P_2$ and $P_3$, three shifting clutches $C_1$, $C_2$ and $C_3$ (i.e., an OD clutch $C_1$, a UD clutch $C_2$, and a 3RD–5TH-RVS clutch $C_3$), two shifting brakes $B_1$ and $B_2$ (i.e., a 2ND- brake $B_1$, and a LOW-RVS brake $B_2$), and a single one-way clutch $F_1$. The transmission T transmits the rotation of a crankshaft S to driving wheels (at arrow OUT) at a predetermined reduction ratio through a torque converter Ct, the main shaft Sm, a counter shaft Sc (see FIG. 4) and a differential D (see FIG. 4).

The structure of the transmission T will be described below with reference to FIGS. 2 to 6.

A casing assembly of the transmission T includes a body casing 1, a torque converter casing 2 coupled to a left side of the body casing 1, and a side cover 3 coupled to a right side of the body casing 1.

The crankshaft S extends from an engine (not shown) which is coupled to a left side of the torque converter CT. The the crankshaft S is positioned on and connected to a left end of the main shaft Sm through the torque converter CT. The torque converter CT includes a pump 4 coupled to the right end of the crankshaft S by bolts with the pump 4 having a plurality of pump blades 4a, a turbine 5 which is spline-coupled to a left end of the main shaft. Sm with the turbine 5 having a plurality of turbine blades 5a, a stator 8 supported through a one-way clutch 7 on a stator boss 6 fitted over an outer periphery of the main shaft Sm, and a lock-up clutch 9 interposed between the pump 4 and the turbine 5. The stator boss 6 is bolted to a right side of the torque converter casing 2 through a flange member 10 integrally welded to a lengthwise intermediate portion of the stator boss 6.

An oil pump 12 is a trochoid pump and is supported on a 2ND brake holder 11 coupled to the right side of the torque converter casing 2. The oil pump 12 includes a pump housing 13 coupled to a right side of the 2ND brake holder 11, a pump cover 14 coupled to a right side of the pump housing 13, a pump shaft 15 extending between the 2ND brake holder 11 and the pump cover 14, an internal-tooth outer rotor 16 rotatably fitted in the pump housing 13, and an external-tooth inner rotor 17 fixedly provided on the pump shaft 15 and meshed with the outer rotor 16.

A torque converter hub 18 is integrally welded to a right end of the pump 4 of the torque converter Ct, and a driving sprocket 19 is spline-coupled to the torque converter hub 18. A follower sprocket 20 is spline-coupled to a left end of the pump shaft 15, and the driving sprocket 19 and the follower sprocket 20 are interconnected by a chain 21. Thus, the rotation of the crankshaft S is transmitted through the pump 4 of the torque converter Ct, the torque converter hub 18, the driving sprocket 19, the chain 21 and the follower sprocket 20 to the pump shaft 15 to drive the oil pump 12.

A main drive gear 24 (see FIGS. 5 and 6) is supported on the body casing 1 with a ball bearing 23 interposed therebetween and is spline-coupled to planetary carriers $PC_1$ and $PC_2$ of the first and second planetary gear mechanisms $P_1$ and $P_2$, so that the main drive gear 24 is driven. The counter shaft Sc is supported on the torque converter casing 2 and the body casing 1 with a roller bearing 25 and a ball bearing 26 interposed therebetween, and includes a counter driven gear 27 meshed with the main drive gear 24, and a final driving gear 29 meshed with a final driven gear 28 of the differential D.

The differential D includes a differential case 32 which is supported on the body casing 1 and the torque converter casing 2 with a pair of roller bearings 30 and 31 interposed therebetween and which carries the final driven gear 28, a pinion shaft 33 extending through the differential case 32, a pair of differential pinions 34, 34 provided on the pinion shaft 33, and differential side gears 36, 36 provided at inner ends of left and right axles 35, 35 and meshed with the differential pinions 34, 34.

The structures of the first, second and third planetary gear mechanisms $P_1$, $P_2$ and $P_3$ and the OD clutch $C_1$, the UD clutch $C_2$, the 3RD–5TH-RVS clutch $C_3$, the 2ND brake $B_1$ and the LOW-RVS brake $B_2$ mounted on the main shaft Sm will be sequentially described below.

(1) First and second planetary gear mechanisms $P_1$ and $P_2$

Each of the first and second planetary gear mechanisms $P_1$ and $P_2$ includes a sun gear $SG_1$, $SG_2$, a planetary carrier $PC_1$, $PC_2$ and a ring gear $RG_1$, $RG_2$, respectively. The planetary carriers $PC_1$ and $PC_2$ are integrally coupled to each other and spline-coupled to the main driving gear 24. The ring gears $RG_1$ and $RG_2$ are integrally formed on a ring gear carrying member 37. A plurality of planetary gears $PG_1$ are carried on the planetary carrier $PC_1$ and simultaneously meshed with the sun gear $SG_1$ and the ring gear $RG_1$. A plurality of inner planetary gears $PG_2$ (not shown) are carried on the planetary carrier $PC_2$ and meshed with the sun gear $SG_2$, while a plurality of outer planetary gears $PG_2$ are also carried on the planetary carrier $PC_2$ and meshed with the ring gear $RG_2$. The inner and outer planetary gears $PG_2$ are meshed with each other.

The ring gear carrying member 37 is coupled to the main shaft Sm through the OD clutch $C_1$ and also to the body casing 1 through the LOW-RVS brake $B_2$, and further is capable of being coupled to the body casing 1 through the one-way clutch $F_1$. The sun gear $SG_1$ of the first planetary gear mechanism $P_1$ is relatively rotatably carried on the main shaft Sm. A sun gear restricting member 38 is integrally coupled to the sun gear $SG_1$ to extend radially outwardly and also is coupled to the main shaft Sm through the UD clutch $C_2$.

(2) Third planetary gear mechanism $P_3$

The third planetary gear mechanism $P_3$ includes a sun gear $SG_3$, a planetary carrier $PC_3$ and a ring gear $RG_3$. Pluralities of inner and outer planetary gears $PG_3$ are carried on the planetary carrier $PC_3$. The plurality of inner planetary gears $PG_3$ are meshed with the sun gear $SG_3$, while the plurality of outer planetary gears $PG_3$ are meshed with the ring gear $RG_3$. The inner and outer planetary gears $PG_3$ are meshed with each other. The sun gear $SG_3$ is integrally formed on the main shaft Sm. The planetary carrier $PC_3$ is spline-coupled to a right end of the torque converter hub 18 and hence, is fixed relative to the body casing 1. The ring gear $RG_3$ is capable of being coupled to a clutch drum 64 of the 3RD–5TH-RVS clutch $C_3$ by the 3RD–5TH-RVS clutch $C_3$ which will be described hereinafter.

(3) OD clutch $C_1$ and UD clutch $C_2$

Figure 5:
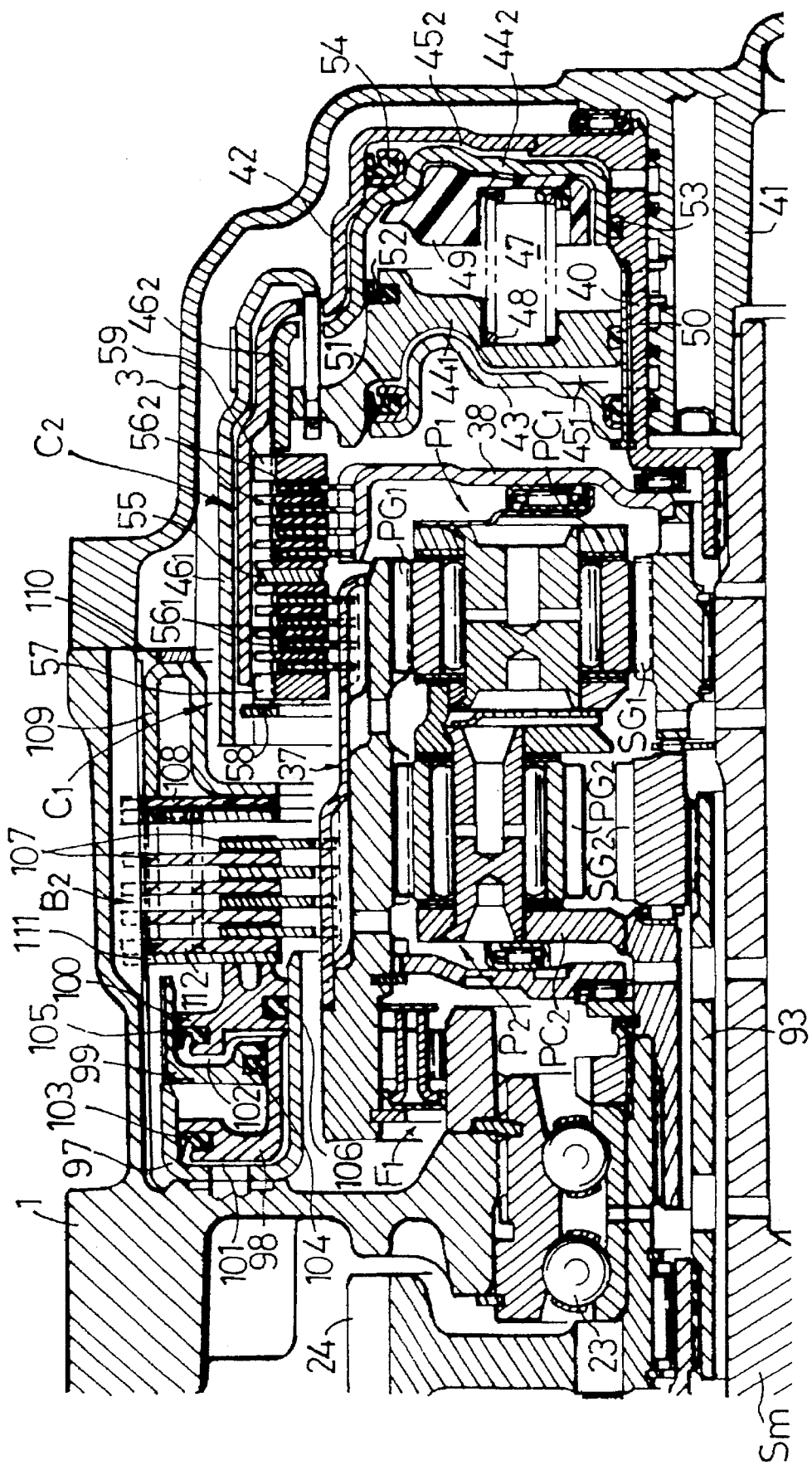
FIG. 5 is an enlarged view of a section D shown in FIG. 1.
Figure 6:
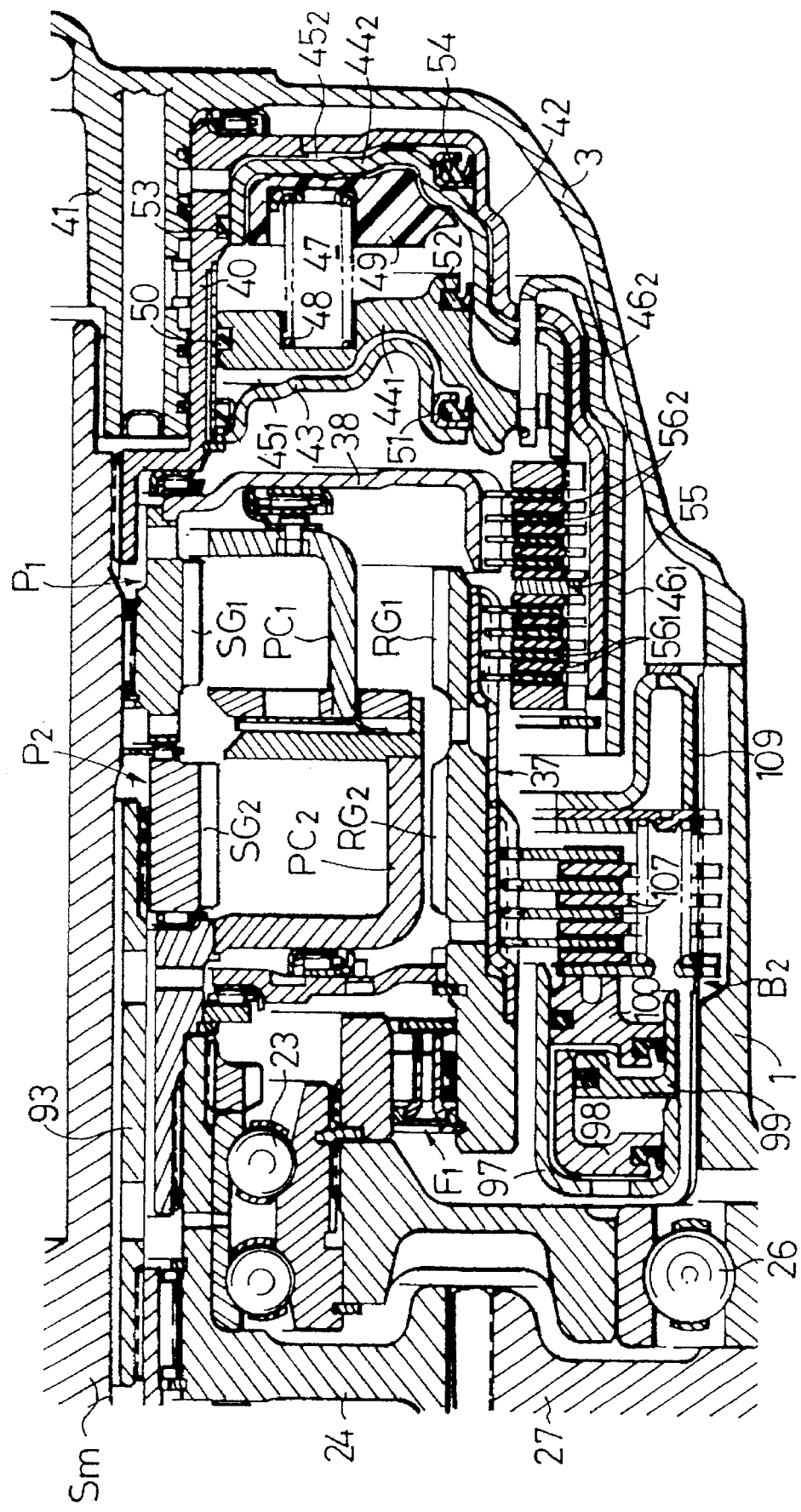
FIG. 6 is an enlarged view of a section E shown in FIG. 1.
Figure 8:
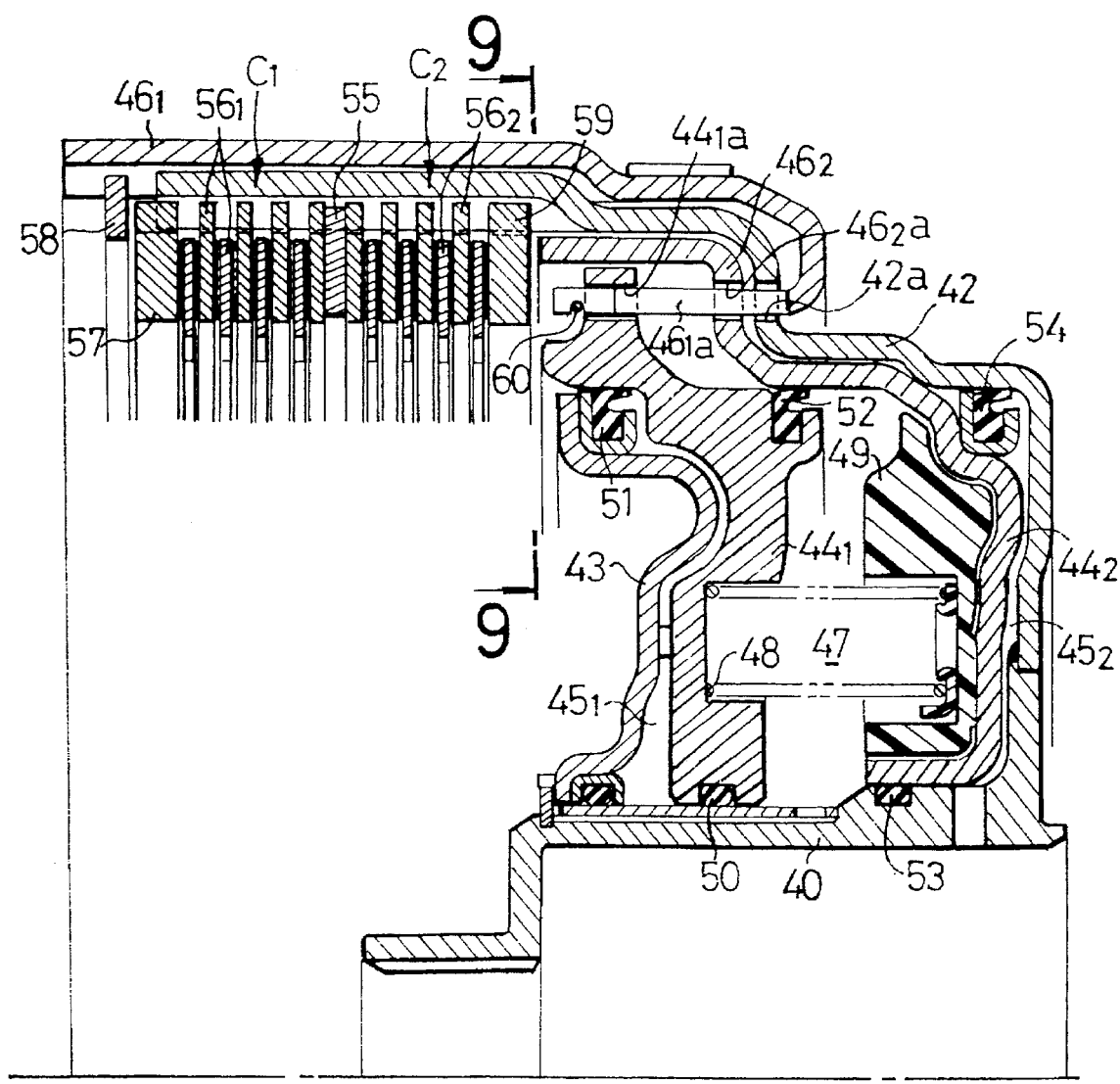
FIG. 8 is an enlarged view of an essential portion shown in FIG. 5.

The OD clutch $C_1$ and the UD clutch $C_2$ are connected in an axially tandem type arrangement. Referring more particularly to FIGS. 5, 6 and 8, a clutch hub 40 is spline-coupled to the main shaft Sm and rotatably fitted over an outer periphery of a support 41 which is integrally formed on an inner surface of the side cover 3 for supporting the right end of the main shaft Sm. A clutch drum 42 is secured to a right end of the clutch hub 40 and extends along an inner wall surface of the side cover 3, with a left end of the clutch drum 42 reaching the radial outside of the ring gear $RG_1$ of the first planetary gear mechanism $P_1$.

The OD clutch $C_1$, constituting a first hydraulic clutch of the present invention, includes a partition plate 43 fixed to a left end of the clutch hub 40, a first clutch piston $44_1$ axially slidably carried on the right side of the partition plate 43, a first clutch chamber $45_1$ defined between the partition plate 43 and the first clutch piston $44_1$, and a first urging member $46_1$ connected to an outer periphery of the first clutch piston $44_1$. The UD clutch $C_2$, constituting a second hydraulic clutch of the present invention, includes a second clutch piston $44_2$ axially slidably carried on the right sides of both the clutch hub 40 and first clutch piston $44_1$, a second clutch chamber $45_2$ defined between the clutch drum 42 and the second clutch piston $44_2$, and a second urging member $46_2$ integrally formed around an outer periphery of the second clutch piston $44_2$.

A canceler oil chamber 47 is defined between a right side of the first clutch piston $44_1$ and a left side of the second clutch piston $44_2$. A return spring 48 is accommodated in the canceler chamber 47 and is locked at its left end to the right side of the first clutch piston $44_1$ and at its right end to the left side of synthetic resin pad 49 mounted to the left side of the second clutch piston $44_2$. By defining the canceler oil chamber 47 between the first clutch piston $44_1$ and the second clutch piston $44_2$ in the above manner, a special member for the canceler oil chamber 47 is not required, leading to a decreased number of parts or components.

The first clutch piston $44_1$ has a sliding surface against the clutch hub 40, a sliding surface against the partition plate 43 and a sliding surface against the second urging member $46_2$, which are sealed by three sealing members 50, 51 and 52, respectively. The second clutch piston $44_2$ has a sliding surface against the clutch hub 40 and a sliding surface against the clutch drum 42, which are sealed by two sealing members 53 and 54, respectively. In this case, openings 42a in the clutch drum 42 and openings $46_2a$ in the second urging member $46_2$ are defined radially outside the second clutch oil chamber $45_2$ and the canceler oil chamber 47 and hence, it is not necessary to provide special seals for the openings 42a and $46_2a$.

A snap ring 55, as a stopper of the present invention, is fixed to a central portion of a spline provided in an inner surface of the clutch drum 42. First frictional engagement elements $56_1$ are alternately positioned one on another on the left side of the snap ring 55 and are comprised of clutch plates engaged in the spline in the clutch drum 42 and clutch disks engaged in a spline provided in the ring gear carrying member 37. The snap ring 58 mounted to the left end of the first urging member $46_1$ is opposed to a left side of an end plate 57 which is positioned on the left end of the group of first frictional engagement elements $56_1$.

The second frictional engagement elements $56_2$ are alternately positioned one on another on the right side of the snap ring 55 and are comprised of clutch plates engaged in the spline in the clutch drum 42 and clutch disks engaged in a spline provided in the sun gear restricting member 38. A left end of the second urging member 46 is opposed to a right side of an end plate 59 which is positioned on the right end of the group of second frictional engage elements $56_2$.

The first urging member $46_1$ connected to an outer periphery of the first clutch piston $44_1$ is axially passed through the openings 42a provided in the clutch drum 42 and openings $46_2a$ provided in the second urging member $46_2$, and is then curved therefrom in a J-shape as viewed in section to extend outwardly beyond an outer periphery of the clutch drum 42. By the fact that the first urging member $46_1$ is axially passed through the openings 42a in the clutch drum 42 and the openings $46_2a$ in the second urging member $46_2$ in the above manner, the first and second clutch pistons $44_1$ and $44_2$ are axially slid independently without interference with each other.

Figure 9:
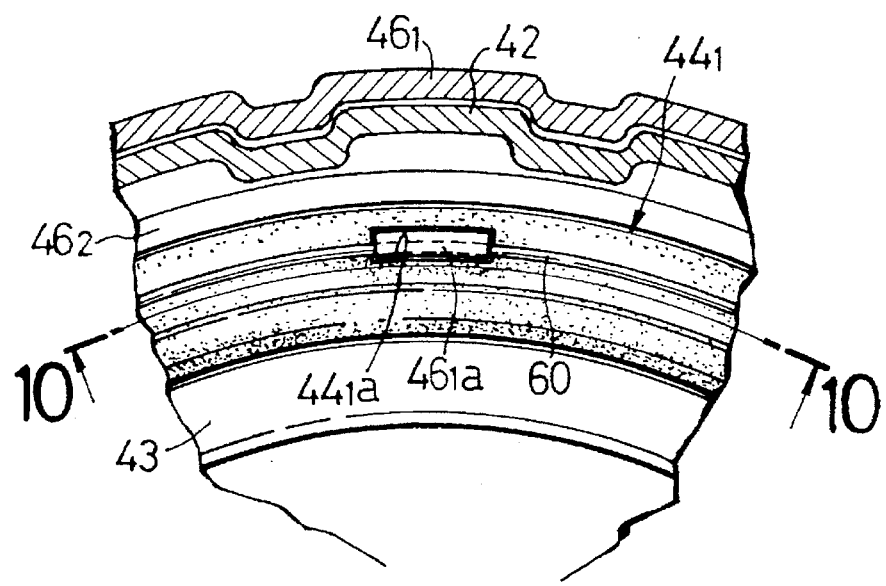
FIG. 9 is a sectional view taken along a line 9—9 in FIG. 8.
Figure 10:
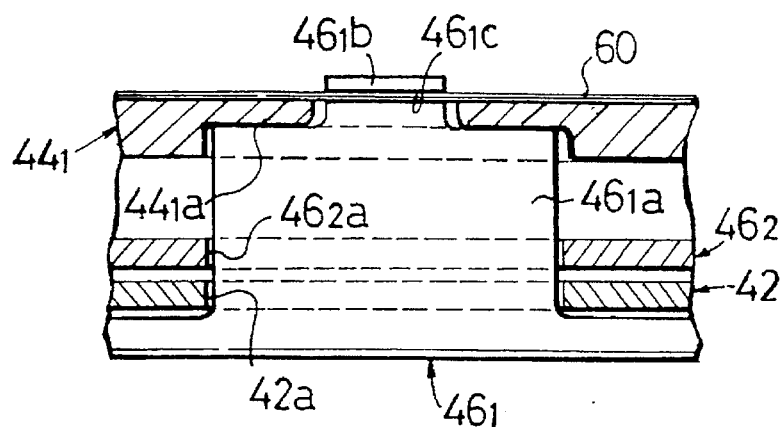
FIG. 10 is a sectional view taken along a line 10—10 in FIG. 9.
Figure 11:
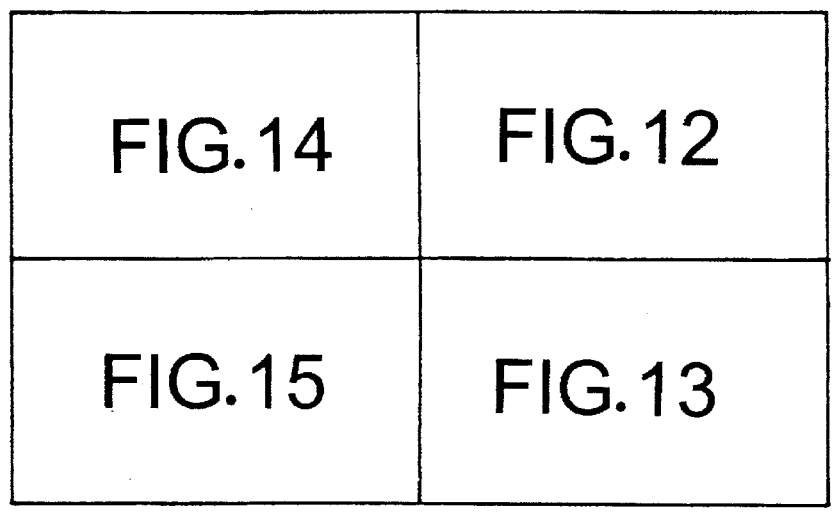
FIG. 11 is a map of the sections of a hydraulic circuit for the transmission.

The structure in the vicinity of a joint between the first clutch piston $44_1$ and the first urging member $46_1$ will be described below in more detail with reference to FIGS. 8 to 10.

The first urging member $46_1$ includes a plurality of legs $46_1a$ protruding at an inner periphery thereof in an axially leftward direction. The legs $46_1a$ pass through the openings 42a provided in the clutch drum 42 and the openings $46_2a$ in the second urging member $46_2$, and thus, the first urging member $46_1$ can be axially slid without interference with the clutch drum 42 and the second urging member $46_2$. Locking projections $46_1b$ are provided at tip end of the legs $46_1a$, and clip grooves $46_1c$ are provided in inner surfaces of the locking projections $46_1b$ at their tip ends, respectively. Locking holes $44_1a$ are provided in an outer peripheral portion of the first clutch piston $44_1$, so that the locking projections $46_1b$ can be fitted into the locking holes $44_1a$.

Therefore, the first urging member $46_1$ and the first clutch piston $44_1$ can be integrally coupled to each other by fitting the locking projections $46_1b$ on the legs $46_1$ of the first urging member $46_1$ into the locking holes $44_1a$ in the first clutch piston $44_1$, and mounting a clip 60 into the clip grooves $46_1c$ in the locking projections $46_1c$ exposed to the left side of the first clutch piston $44_1$.

Thus, if a working oil is supplied to the first clutch oil chamber $45_1$ of the OD clutch $C_1$, the first urging member $46_1$ is moved to the right along with the first clutch piston $44_1$, whereby the snap ring 58 mounted at the tip end of the first urging member $46_1$ urges the end plate 57 and the first frictional engagement elements $56_1$ against the snap ring 55, thereby causing the ring gear carrying member 37 to be coupled to the clutch drum 42. On the other hand, if the working oil is supplied to the second clutch oil chamber $45_2$ of the UD clutch $C_2$, the second urging member $46_2$ integral with the second clutch piston $44_2$ is moved leftwardly, whereby the tip end of the second urging member $46_2$ urges the end plate 59 and the second frictional engagement elements $56_2$ against the snap ring 55, thereby causing the sun gear restricting member 38 to be coupled to the clutch drum 42.

In this way, the second frictional engagement elements $56_2$ of the UD clutch $C_2$ cannot be influenced at all during operation of the OD clutch $C_1$, and the first frictional engagement elements $56_1$ of the OD clutch $C_1$ cannot be influenced at all during operation of the UD clutch $C_2$. Therefore, it is possible to perform a reliable and independent operation of each of the hydraulic clutches $C_1$ and $C_2$.

(4) 3RD–5TH-RVS clutch $C_3$

The 3RD–5TH-RVS clutch $C_3$ includes a clutch hub 63 relatively rotatably carried on a shaft portion of the flange member 10, a clutch drum 64 coupled to the clutch hub 63, a clutch piston 65 axially slidably fitted to an inner periphery of the clutch drum 64, and a partition plate 66 axially non-slidably fixed on a right side of the clutch piston 65. A clutch oil chamber 67 is defined between the clutch drum 64 and the clutch piston 65, and a canceler oil chamber 68 is defined between the clutch piston 65 and the partition plate 66.

A return spring 69 is accommodated in the canceler oil chamber 68 and locked at its right end to the left side of the partition plate 66 and at its left end to the right side of a synthetic resin pad 70 which is mounted on the right side of the clutch piston 65. The clutch piston 65 has a sliding surface against the clutch hub 63, a sliding surface against the clutch drum 64 and a sliding surface against the partition plate 66, which are sealed by three sealing members 71, 72 and 73, respectively.

Frictional engagement elements 74 are alternately positioned one on another and are comprised of clutch plates engaged in a spline provided in an inner surface of the clutch drum 64 and clutch disks engaged in a spline provided in an outer periphery of the ring gear $RG_3$ of the third planetary carrier $P_3$. An end plate 75 is positioned on the right end of the group of the frictional engagement elements 74 and locked to a snap ring 76 mounted in the spline in the clutch drum 64, and an end plate 77 is positioned on the left end of the group of the frictional engagement elements 74 and opposed to an urging member 78 integrally formed at a tip end of the clutch piston 65.

Thus, if the working oil is supplied to the clutch oil chamber 67 to move the clutch piston 65 rightwardly against the biasing force of the return spring 69, the urging member 78 causes the frictional engagement elements 74 to be put into pressure contact with one another between the urging member 78 and the snap ring 76. As a result, the ring gear $RG_3$ of the third planetary gear mechanism $P_3$ is coupled to the clutch drum 64.

(5) 2ND brake $B_1$

The 2ND brake $B_1$ includes a cylinder 80 formed in a right side of the 2ND brake holder 11, a brake piston 83 slidably received in the cylinder 80 with a pair of sealing members 81 and 82 interposed therebetween, a brake oil chamber 84 defined between the cylinder 80 and the brake piston 83, a plurality of guide arms 85 projectingly provided on a right side of the 2ND brake holder 11, an urging member 87 which is guided through guide members 86 mounted on the guide arms 85, so that the left end of the urging member 87 abuts against the brake piston 83, and return springs 88 mounted under compression between the brake piston 83 and the guide members 86.

Frictional engagement elements 89 are positioned alternately one on another and are comprised of brake plates engaged in splines provided in the guide arms 85 and brake disks engaged in splines provided in an outer surface of the clutch drum 64 of the 3RD–5TH-RVS clutch $C_3$. An end plate 90 is positioned on the right end of the group of frictional engagement elements 89 and is locked to a snap ring 91 mounted in the splines in the guide arms 85. An end plate 92 is positioned on the left end of the group of the frictional engagement elements 89 and is opposed to the right end of the urging member 87.

Thus, if the working oil is supplied to the brake oil chamber 84 to move the brake piston 83 rightwardly against the biasing force of the return springs 88, the urging member 87 causes the frictional engagement elements 89 to be put into pressure contact with one another between the urging member 87 and the snap ring 91, thereby coupling the clutch drum 64 to the guide arms 85. As a result, the sun gear $SG_2$ (FIGS. 5 and 6) of the second planetary gear mechanism $P_2$ is coupled to the body casing 1 through a sleeve 93, a hub 94, a connecting plate 95, the clutch drum 64, the frictional engagement elements 89 and the guide arms 85 of the 2ND brake holder 11.

(6) LOW-RVS brake $B_2$

The LOW-RVS brake $B_2$ includes a cylinder 97 supported in the body casing 1, an assist piston 98, a reaction piston 99 and a main piston 100 which are sequentially mounted within the cylinder 97 in the named order from the left side toward the right side, a first oil chamber 101 defined between the assist piston 98 and the cylinder 97, and a second oil chamber 102 defined between the reaction piston 99 and the main piston 100, which second oil chamber 102 is in communication with the first oil chamber 101.

The assist piston 98 has a sliding surface against the cylinder 97, which is sealed by a sealing member 103. The reaction piston 99 has a sliding surface against the assist piston 98, which is sealed by a sealing member 104. The main piston 100 has a sliding surface against the reaction piston 99 and a sliding surface against the cylinder 97, which are sealed by a pair of sealing members 105 and 106, respectively.

Frictional engagement elements 107 are alternately positioned one on another and are comprised of brake plates engaged in a spline provided in the inner surface of the body casing 1 and brake disks engaged in a spline provided in the outer periphery of the ring gear carrying member 37. An end plate 108 is positioned on the right end of the group of the frictional engagement elements 107 and is supported on the side cover 3 with a back-up plate 109 and a shim 110 interposed therebetween. An end plate 111 is positioned on the left end of the group of the frictional engagement elements 107 and is opposed to the right end of the main piston 100. A plurality of return springs 112 are mounted under compression between the left and right end plates 108 and 111 and extend through holes in the friction engagement elements 107.

Thus, if the working oil is supplied to the first oil chamber 101 in the cylinder 97, the assist piston 98 is moved rightwardly to urge the main piston 100 rightwardly, while the working oil supplied to the second oil chamber 102 communicating with the first oil chamber 101 urges the main piston 100 rightwardly. A resultant force for an urging force of the assist piston 98 moved rightwardly by a hydraulic pressure in the first oil chamber 101 and an urging force for the main piston 100 moved rightwardly by a hydraulic pressure in the second oil chamber 102 is transmitted to the left end plate 111, causing the frictional engagement elements 107 to be put into firm pressure contact with one another. As a result, the ring gear carrying member 37 of the first and second planetary gear mechanisms $P_1$ and $P_2$ is coupled to the body casing 1.

The operation of the embodiment of the present invention having the above-described construction will be described below with reference to the diagrammatic view in FIG. 7 and Table 1 below.

When the UD clutch $C_2$ is brought into an engaged state to establish a first shift stage, the sun gear $SG_1$ of the first planetary gear mechanism $P_1$ is coupled to the main shaft Sm. At this time, the ring gear $RG_2$ of the second planetary gear mechanism $P_2$ integral with the ring gear $RG_1$ of the first planetary gear mechanism $P_1$ is coupled to the body casing 1 through the one-way clutch $F_1$. As a result, the rotation of the sun gear $SG_1$ of the first planetary gear mechanism $P_1$ causes the integrally formed planetary carriers $PC_1$ and $PC_2$ of the first and second planetary gear mechanisms $P_1$ and $P_2$ to be driven at a predetermined speed, thereby establishing the first shift stage with a reduction ratio of 3.647. When an engine braking operation occurs during deceleration in the first shift stage, the one-way clutch $F_1$ is brought into a non-engaged state and hence, the LOW-RVS brake $B_2$ is operated to couple the ring gear $RG_2$ of the second planetary gear mechanism $P_2$ to the body casing 1.

When the UD clutch $C_2$ and the 2ND brake $B_1$ are brought into engaged states to establish a second shift stage, the sun gear $SG_1$ of the first planetary gear mechanism $P_1$ is coupled to the main shaft Sm, while the sun gear $SG_2$ of the second planetary gear mechanism $P_2$ is coupled to the body casing 1. As a result, the rotation of the sun gear $SG_1$ of the first planetary gear mechanism $P_1$ causes the planetary carriers $PC_1$ and $PC_2$ of the first and second planetary gear mechanisms $P_1$ and $P_2$ to be driven at a predetermined speed, thereby establishing the second shift stage with a reduction ratio of 2.118.

When the UD clutch $C_2$ and the 3RD–5TH-RVS clutch $C_3$ are brought into their engaged states in order to establish a third shift stage, the sun gear $SG_1$ of the first planetary gear mechanism $P_1$ is coupled to the main shaft Sm, while the ring gear $RG_3$ of the third planetary gear mechanism $P_3$ is coupled to the sun gear $SG_2$ of the second planetary gear mechanism $P_2$. As a result, the rotation of the main shaft Sm is transmitted at differential numbers of rotations to the sun gear $SG_1$ of the first planetary gear mechanism $P_1$ and the sun gear $SG_2$ of the second planetary gear mechanism $P_2$. The integrally formed planetary carriers $PC_1$ and $PC_2$ of the first and second planetary gear mechanisms $P_1$ and $P_2$ are driven at predetermined speeds based on the difference between numbers of rotations, thereby establishing the third shift stage with a reduction ratio of 1.388.

When the OD clutch $C_1$ and the UD clutch $C_2$ are brought into their engaged states in order to establish a fourth shift, both the ring gear $RG_1$ and the sun gear $SG_1$ of the first planetary gear mechanism $P_1$ are coupled to the main shaft Sm. As a result, the integrally formed planetary carriers $PC_1$ and $PC_2$ of the first and second planetary gear mechanisms $P_1$ and $P_2$ are rotated at the same number of rotations as the main shaft Sm, thereby establishing the fourth shift stage with a reduction ratio of 1.000.

When the OD clutch $C_1$ and the 3RD–5TH-RVS clutch $C_3$ are brought into their engaged states in order to establish a fifth shift stage, the ring gear $RG_1$ of the first planetary gear mechanism $P_1$ is coupled to the main shaft Sm, while the ring gear $RG_3$ of the third planetary gear mechanism $P_3$ is coupled to the sun gear $SG_2$ of the second planetary gear mechanism $P_2$. As a result, the rotation of the main shaft Sm is transmitted to the ring gear $RG_1$ of the first planetary gear mechanism $P_1$ and the sun gear $SG_2$ of the second planetary gear mechanism $P_2$ to drive the integrally formed planetary carriers $PC_1$ and $PC_2$ of the first and second planetary gear mechanisms $P_1$ and $P_2$ at numbers of rotations lower than that of the main shaft Sm, thereby establishing the fifth shift stage with a reduction ratio of 0.721.

When the 3RD–5TH-RVS clutch $C_3$ and the LOW-RVS brake $B_2$ are brought into their engaged states in order to establish a reverse shift stage, the ring gear $RG_3$ of the third planetary gear mechanism $P_3$ is coupled to the sun gear $SG_2$ of the second planetary gear mechanism $P_2$, while the ring gear $RG_2$ of the second planetary gear mechanism $P_2$ is coupled to the body casing 1. As a result, the rotation of the main shaft Sm is transmitted to the sun gear $SG_2$ of the second planetary gear mechanism $P_2$, and the integrally formed planetary carriers $PC_1$ and $PC_2$ of the first and second planetary gear mechanisms $P_1$ and $P_2$ driven in a reverse direction from that of the main shaft Sm, thereby establishing the reverse shift stage with a reduction ratio of 2.908. The six gear shift stages are summarized in Table 1 below.

Figure 12:
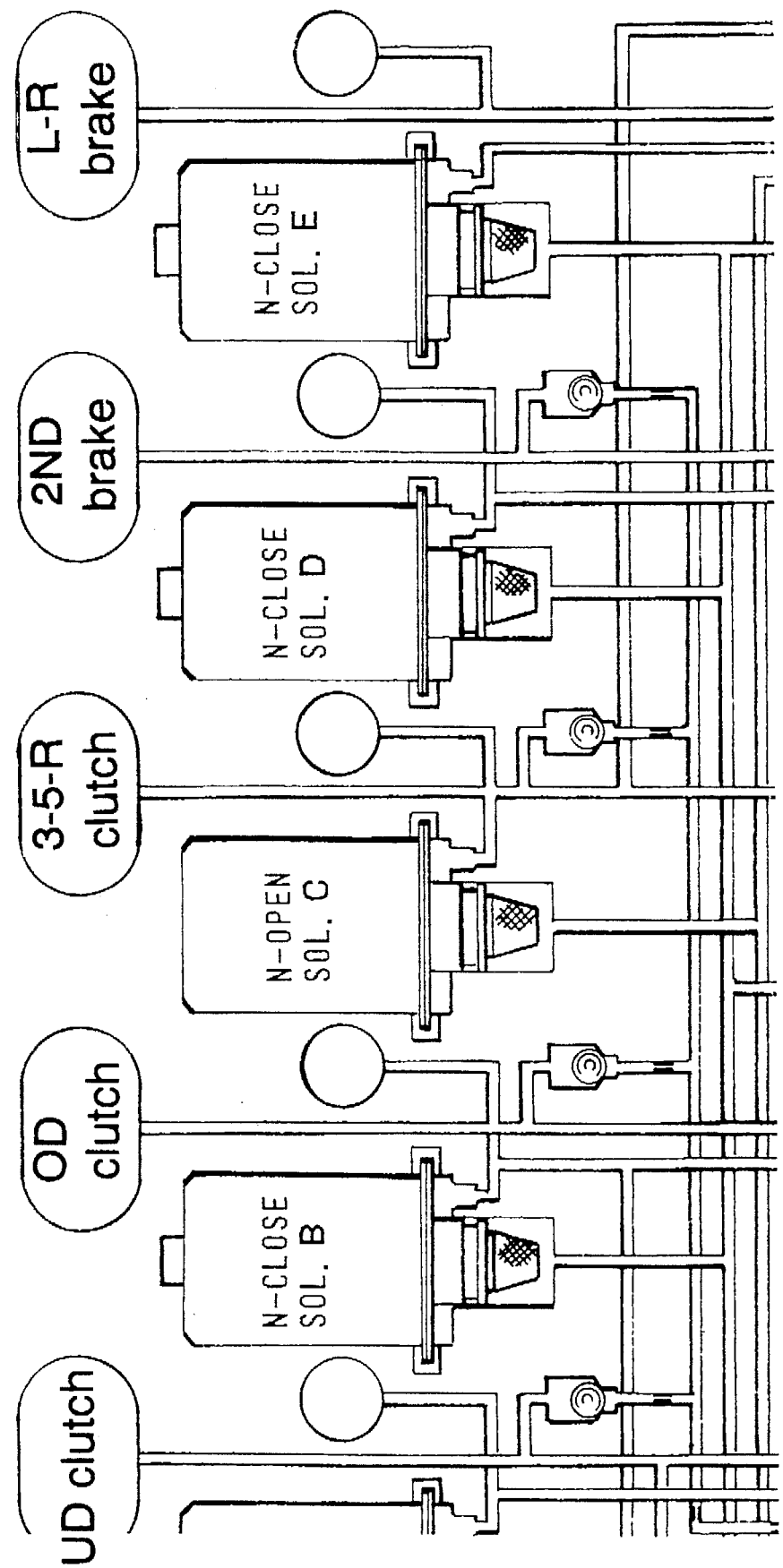
FIGS. 12 to 15 are views of the hydraulic circuit divided into four portions as shown in FIG. 11.
Figure 13:
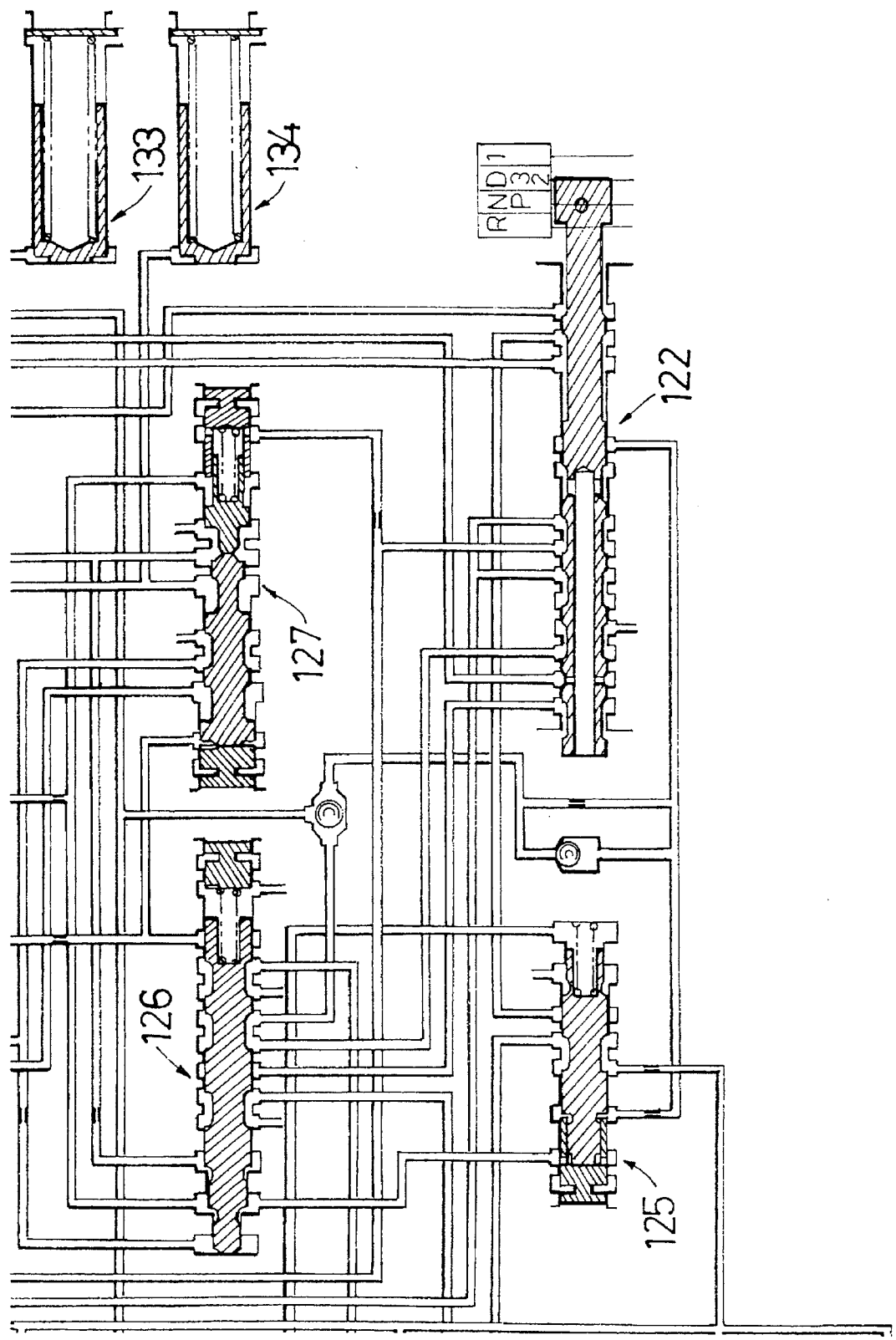
Figure 14:
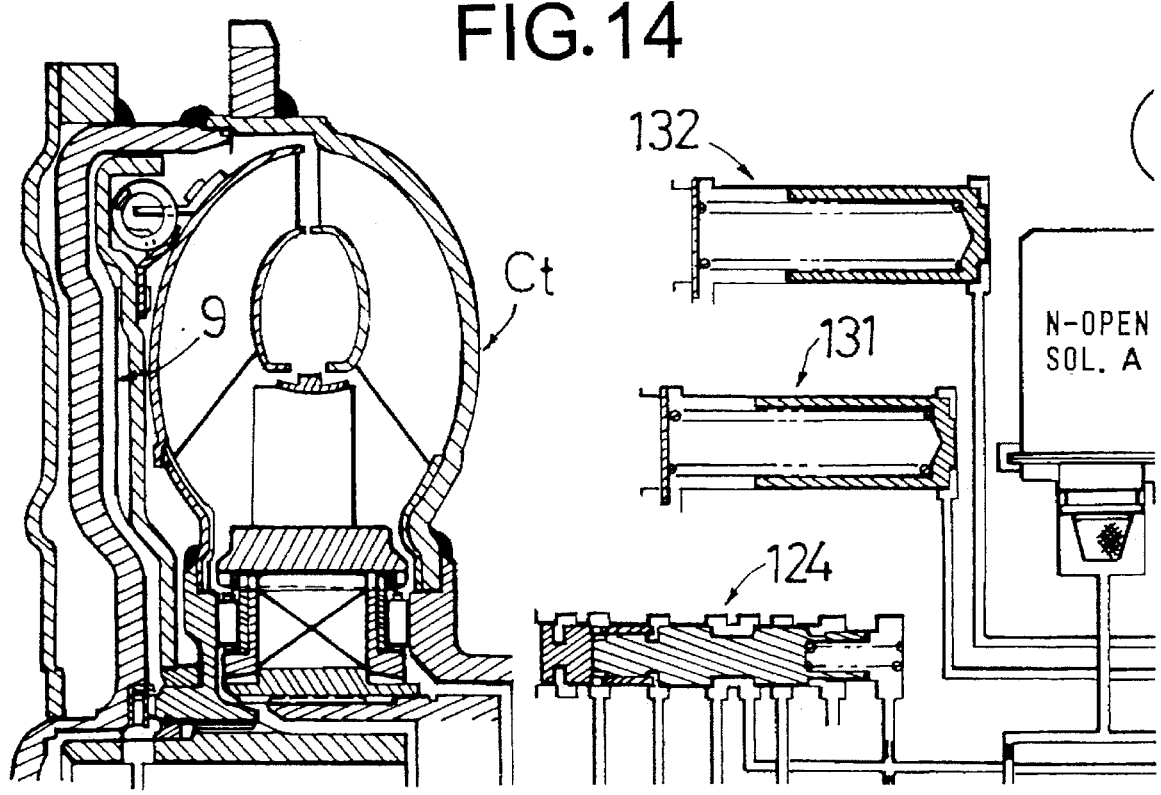
Figure 15:
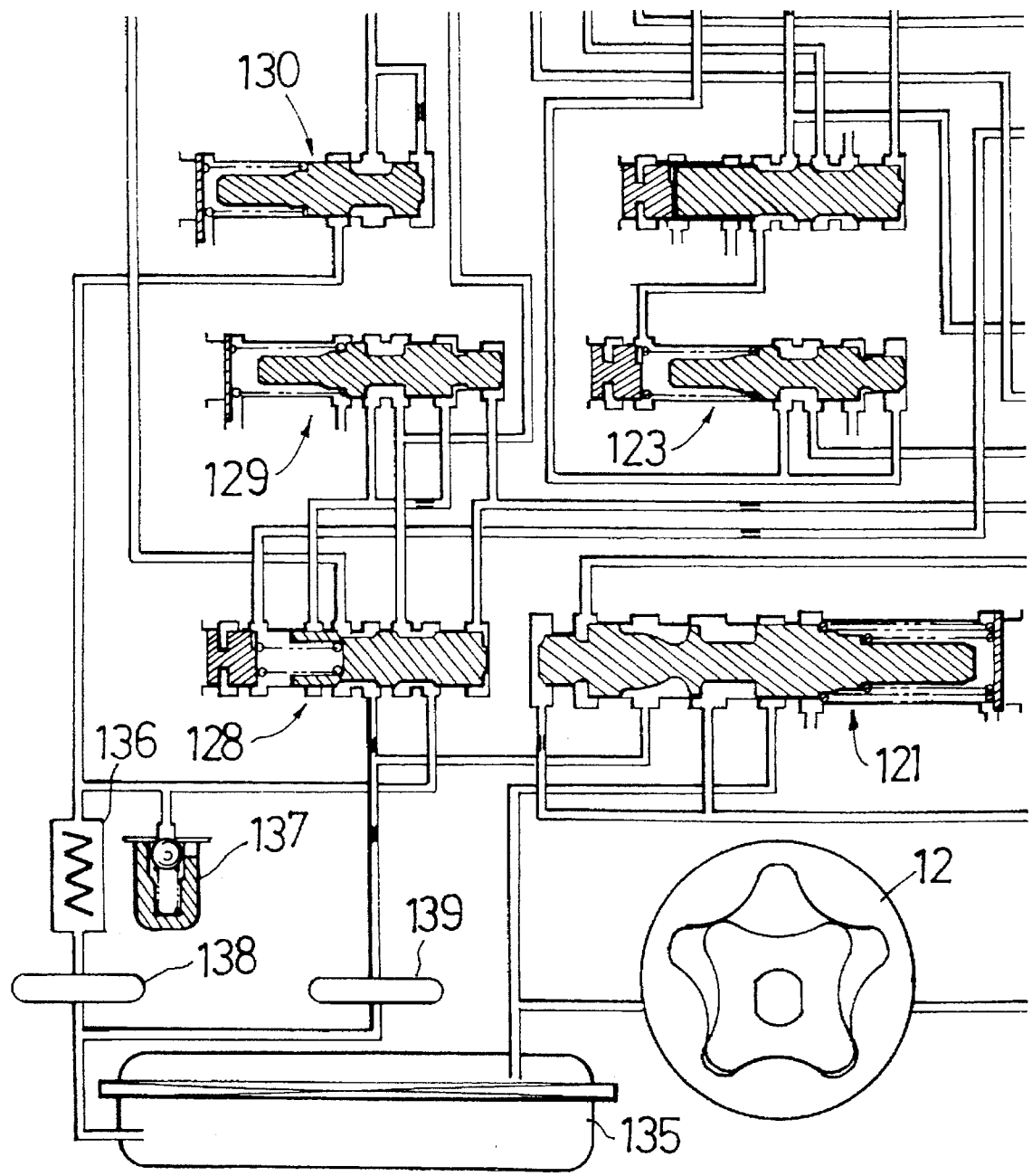
Figure 16:
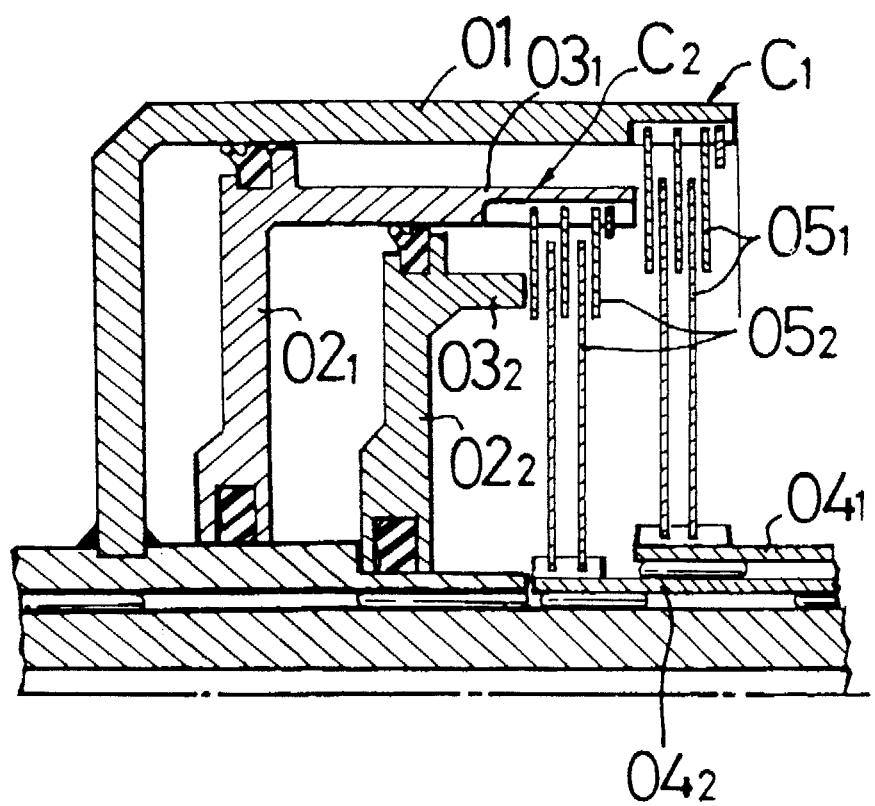
FIG. 16 is a sectional view of a portion of a prior art tandem type hydraulic clutch.

A hydraulic circuit for controlling the three shifting clutches $C_1$, $C_2$ and $C_3$, the two shifting brakes $B_1$ and $B_2$ and the lock-up clutch 9 of the transmission T will be described below with reference to FIGS. 11 to 15. FIGS. 12 to 15 are views of the hydraulic circuit divided into four portions, wherein FIG. 12 shows a right, upper portion of the hydraulic circuit; FIG. 13 shows a right, lower portion of the hydraulic circuit; FIG. 14 shows a left, upper portion of the hydraulic circuit; and FIG. 15 shows a left, lower portion of the hydraulic circuit.

The hydraulic circuit includes a regulator valve 121 for adjusting the pressure discharged from the oil pump 12 to generate a line pressure, a manual valve 122 capable of being operated in mechanical association with a shift lever to switch a "1" range, a "D, 3, 2" range, a "N, P" range and a "R" range from one to another, a reducing valve 123 for reducing the regulator pressure to a reducing pressure at a "2" or more shift range in the "D, 3, 2" range, a forward pressure shifting valve 124 for switching the regulator pressure and the reducing pressure from one to the other, and a reverse pressure shifting valve 125 for increasing the regulator pressure in the reverse range. The hydraulic circuit further includes a pressure delivery valve 126 for switching oil passages from one to another between the "1" shift and the "2" or more shift, a pressure release valve 127 for switching oil passages from one to another between a neutral, the reverse and the forward, an L/C shifting valve 128 for switching the ON/OFF of the lock-up clutch 9, an L/C control valve 129 for changing the back pressure of the lock-up clutch 9, and a T/C check valve 130 for defining a lower limit value of the internal pressure of the torque converter Ct.

Provided in the hydraulic circuit are a normally-opened solenoid valve A, a normally-closed solenoid valve B, the normally-opened solenoid valve C, a normally-closed solenoid valve D and a normally-closed solenoid valve E. Further provided in the hydraulic circuit are four accumulators 131, 132, 133 and 134 in correspondence to the UD clutch $C_2$, the OD clutch $C_1$, the 3RD–5TH-TVS clutch $C_3$ and the 2ND brake $B_1$.

Provided in an oil passage returning to an oil tank 135 are an oil cooler 136, an oil cooler release valve 137, and a front lubricated portion 138 and a rear lubricated portion 139 of the transmission T.

The operations of the three shifting clutches $C_1$, $C_2$ and $C_3$ and the two shifting brakes $B_1$ and $B_2$ will be described below with reference to Table 1.

When the manual valve 122 is in the "N, P" range, the transmitting of the hydraulic pressure resulting from the adjustment by the forward pressure shifting valve 124 and the regulator valve is inhibited by the manual valve 122.

TABLE 1

|  | OD (C1) | UD (C2) | 3-5-R (C3) | 2ND (B1) | L & R (B2) | SOL. A | SOL. B | SOL. C | SOL. D | SOL. E |
| --- | --- | --- | --- | --- | --- | --- | --- | --- | --- | --- |
| 1ST | X | O | X | X | O (EB) | OFF | OFF | ON | OFF | ON (EB) |
| 2ND | X | O | X | O | X | OFF | OFF | ON | ON | ON (LU) |
| 3RD | X | O | O | X | X | OFF | OFF | OFF | OFF | ON (LU) |
| 4TH | O | O | X | X | X | OFF | ON | ON | OFF | ON (LU) |
| 5TH | O | X | O | X | X | ON | ON | OFF | OFF | ON (LU) |
| RVS | X | X | O | X | O | OFF | OFF | OFF | OFF | OFF |

Where,
O: means means engaged
X: means means non-engaged
(EB): means means during engine braking
(LU): means means during locking-up of torque converter When the manual valve 122 is in the "D, 3, 2" range, the solenoid valve C is turned ON, while the other solenoid valves A, B and C are turned OFF, whereby only the solenoid valve A is opened. As a result, the UD clutch $C_2$ is brought into its engaged state to establish the "1" shift stage.

Then the solenoid valves C and D are turned ON, while the other solenoid valves A, B and E are turned OFF, whereby the solenoid valves A and D are opened. As a result, the UD clutch $C_2$ and the 2ND brake $B_1$ are brought into their engaged states to establish the "2" shift stage.

For the "3" shift range, all the solenoid valves A, B, C, D and E are turned OFF, whereby the solenoid valves A and C are opened. As a result, the UD clutch $C_2$ and the 3RD–5TH–RVS clutch $C_3$ are brought into their engaged states to establish the "3" shift stage.

Then the solenoid valves B and C are turned ON, while the other solenoid valves A, D and E are turned OFF, whereby the solenoid valves A and B are opened. As a result, the UD clutch $C_2$ and the OD clutch $C_1$ are brought into their engaged states to establish the fourth shift stage.

For the "5" shift range, the solenoid valves A and B are turned ON, while solenoid valves C, D and E are turned OFF, whereby only the solenoid valves B and C are opened. As a result the OD clutch $C_1$ and 3RD–5TH-RVS clutch $C_3$ are brought into their engaged states to establish the fifth shift stage.

When the manual valve 122 is in the "1" range, the solenoid valve C is turned ON, while the solenoid valves A, B, D and E are turned OFF, whereby only the solenoid valve A is opened. As a result, the UD clutch $C_2$ is brought into its engaged state to establish the "1" shift stage.

When the manual valve 122 is in the "R" range, all the solenoid valves A, B, C, D and E are turned OFF, whereby the solenoid valves A and C are opened. The opening of the solenoid valve C causes the 3RD–5TH-RVS clutch $C_3$ to be brought into its engaged state. However, the transmitting of the hydraulic pressure to the solenoid valve A is inhibited by the manual valve 122 and hence, the UD clutch $C_2$ is not brought into its engaged state, and the LOW-RVS brake $B_2$, to which the hydraulic pressure is directly transmitted from the manual valve 122, is brought into its engaged state. Thus, the 3RD–5TH-RVS clutch $C_3$ and the LOW-RVS brake $B_2$ are brought into their engaged states to establish the backward shift stage.

The solenoid valve E is turned ON only during engine braking at the "1" shift stage in the "1" range and only upon engagement of the lock-up clutch 9 at the "2" to "4" shift stages.

The operation of the lock-up clutch 9 of the torque converter Ct will be described below.

When the lock-up clutch 9 is to be brought into its non-engaged state, the oil resulting from adjustment of the hydraulic pressure by the regulator valve 121 is fed to the lock-up clutch 9 and imposed on the face of the lock-up clutch 9 to reach the inside of the torque converter Ct and then returned through the L/C shifting valve 128 and the oil cooler 136 to the oil tank 135. In this state, the lock-up clutch 9 is brought into the non-engaged state, and the torque converter Ct exhibits a torque amplifying function.

When the lock-up clutch 9 is to be brought into the engaged state, the solenoid valve E is turned ON and opened, so that the hydraulic pressure adjusted therein operates the L/C shifting valve 128 and the L/C control valve 129. As a result, the oil passed through the regulator valve 121 is further adjusted by the L/C control valve 129 and supplied into the torque converter Ct and returned therefrom through the L/C shifting valve 128 and the oil cooler 136 to the oil tank 135. As a result, the lock-up clutch 9 is brought into the engaged state by the oil supplied into the torque converter Ct, whereby the pump 4 and the turbine 5 of the torque converter Ct are directly connected.

What is claimed is:

1. A tandem type hydraulic clutch system, comprising: a first hydraulic clutch having first frictional engagement elements for being urged by a first urging member connected to a first clutch piston which is driven by a hydraulic pressure applied to a first clutch oil chamber; and a second hydraulic clutch having second frictional engagement elements for being urged by a second urging member connected to a second clutch piston which is driven by a hydraulic pressure applied to a second clutch oil chamber, said first and second hydraulic clutches being axially juxtaposed, wherein said first and second frictional engagement elements are supported on axially opposite sides of a stopper fixedly mounted on a clutch drum, said first frictional engagement elements being urged toward said stopper by said first urging member, and said second frictional engagement elements being urged toward said stopper by said second urging member, wherein said first and second clutch pistons are disposed on one axial side of said first and second frictional engagement elements, and wherein one of said first and second clutch pistons is located at a position axially closer to said first and second frictional engagement elements than the other of said first and second clutch pistons and said one clutch piston applies an urging engagement force to one of said first and second frictional engagement elements from an axial side opposite said one axial side of said first and second frictional engagement elements whereas said other clutch piston applies an urging engagement force to the other of said first and second frictional engagement elements from said one axial side.

2. A tandem type hydraulic clutch system according to claim 1, further including a canceler oil chamber defined between said first and second clutch pistons.

3. A tandem type hydraulic clutch system according to claim 2, wherein a biasing means is disposed in said canceler oil chamber so as to urge said first and second clutch pistons away from each other.

4. A tandem type hydraulic clutch system according to claim 1, wherein said second clutch piston and said second urging member are disposed within said clutch drum, said first clutch piston is disposed within said clutch drum, said first urging member is disposed outside said clutch drum, and said first clutch piston and said first urging member are connected to each other through openings defined in said clutch drum and said second urging member.

5. A tandem type hydraulic clutch system according to claim 4, wherein said second clutch oil chamber is defined between said clutch drum and said second clutch piston, said openings being located radially outside the second clutch oil chamber.

6. A tandem type hydraulic clutch system according to claim 4, further including a canceler oil chamber defined between said first and second clutch pistons.

7. A tandem type hydraulic clutch system according to claim 4, wherein said second clutch oil chamber is defined between said clutch drum and said second clutch piston, said openings being located radially outside the second clutch oil chamber.

8. A tandem type hydraulic clutch system according to claim 4, further including a canceler oil chamber defined between said first and second clutch pistons.

9. A tandem type hydraulic clutch system, comprising: a first hydraulic clutch having first frictional engagement elements for being urged by a first urging member connected to a first clutch piston which is driven by a hydraulic pressure applied to a first clutch oil chamber; and a second hydraulic clutch having second frictional engagement elements for being urged by a second urging member connected to a second clutch piston which is driven by a hydraulic pressure applied to a second clutch oil chamber, said first and second hydraulic clutches being axially juxtaposed, wherein said first and second frictional engagement elements are supported on axially opposite sides of a stopper fixedly mounted on a clutch drum, said first frictional engagement elements being urged toward said stopper by said first urging member, and said second frictional engagement elements being urged toward said stopper by said second urging member, and wherein said second clutch piston and said second urging member are disposed within said clutch drum, said first clutch piston is disposed within said clutch drum, said first urging member is disposed outside said clutch drum, and said first clutch piston and said first urging member are connected to each other through openings defined in said clutch drum and said second urging member.

10. A tandem type hydraulic clutch system according to claim 9, wherein said second clutch oil chamber is defined between said clutch drum and said second clutch piston, said openings being located radially outside the second clutch oil chamber.

11. A tandem type hydraulic clutch system according to claim 9, wherein said first clutch piston, said first clutch oil chamber, said second clutch piston and said second clutch oil chamber are all located on one axial side of said first and second frictional engagement elements.

12. A tandem type hydraulic clutch system according to claim 9, wherein said second clutch oil chamber is defined between said clutch drum and said second clutch piston, said openings being located radially outside the second clutch oil chamber.

13. A tandem type hydraulic clutch system according to claim 9, further including a canceler oil chamber defined between said first and second clutch pistons.

14. A tandem type hydraulic clutch system according to claim 13, wherein a biasing means is disposed in said canceler oil chamber so as to urge said first and second clutch pistons away from each other.

15. A tandem type hydraulic clutch system comprising: a first hydraulic clutch having first frictional engagement elements for being urged by a first urging member connected to a first clutch piston which is driven by a hydraulic pressure applied to a first clutch oil chamber; and a second hydraulic clutch having second frictional engagement elements for being urged by a second urging member connected to a second clutch piston which is driven by a hydraulic pressure applied to a second clutch oil chamber, said first and second hydraulic clutches being axially juxtaposed, wherein said first and second frictional engagement elements are supported on axially opposite sides of a stopper fixedly mounted on a clutch drum, said first frictional engagement elements being urged toward said stopper by said first urging member, and said second frictional engagement elements being urged toward said stopper by said second urging member, and wherein said first clutch piston, said first clutch oil chamber, said second clutch piston and said second clutch oil chamber are all located on one axial side of said first and second frictional engagement elements, and a canceler oil chamber is defined between said first and second clutch pistons.

* * * * *